(12) United States Patent
Ubaldi

(10) Patent No.: US 9,521,807 B2
(45) Date of Patent: Dec. 20, 2016

(54) GUIDING UNIT FOR A DEVICE FOR HARVESTING THE LONG AGRICULTURAL PRODUCTS AND DEVICE FOR HARVESTING AGRICULTURAL PRODUCTS COMPRISING THE GUIDING UNIT

(71) Applicant: ROC S.R.L., Poggio Torriana (IT)

(72) Inventor: Raffaele Ubaldi, Santa Giustina di Rimini (IT)

(73) Assignee: ROC S.R.L., Poggio Torriana (IT)

( * ) Notice: Subject to any disclaimer, the term of this patent is extended or adjusted under 35 U.S.C. 154(b) by 0 days.

(21) Appl. No.: 14/703,268

(22) Filed: May 4, 2015

(65) Prior Publication Data

US 2015/0313082 A1    Nov. 5, 2015

(30) Foreign Application Priority Data

May 5, 2014    (IT) ............... BO2014A0260

(51) Int. Cl.
| | |
|---|---|
| A01D 43/00 | (2006.01) |
| A01D 57/20 | (2006.01) |
| A01D 89/00 | (2006.01) |
| A01D 84/00 | (2006.01) |

(52) U.S. Cl.
CPC ............ *A01D 57/20* (2013.01); *A01D 84/00* (2013.01); *A01D 89/008* (2013.01)

(58) Field of Classification Search
CPC .... A01D 89/008; A01D 89/006; A01D 89/00; A01D 41/10; A01D 89/007; Y10S 56/21
USPC ........................................................ 56/190
See application file for complete search history.

(56) References Cited

U.S. PATENT DOCUMENTS

| | | | | | |
|---|---|---|---|---|---|
| 2,362,861 | A | * | 11/1944 | Russell | A01F 15/04 100/100 |
| 2,524,233 | A | * | 10/1950 | Russell | A01D 89/00 100/100 |
| 2,571,489 | A | * | 10/1951 | Russell | A01F 15/101 100/139 |
| 2,647,355 | A | * | 8/1953 | Luke | A01D 89/00 100/142 |
| 2,691,266 | A | * | 10/1954 | Meyer | A01D 41/10 56/341 |
| 2,872,772 | A | * | 2/1959 | Nolt | A01D 89/008 56/364 |

(Continued)

FOREIGN PATENT DOCUMENTS

| | | |
|---|---|---|
| DE | 10 2012 011 591 A1 | 12/2013 |
| DE | 202014003637 U1 * | 7/2015 ............. A01D 90/04 |

(Continued)

*Primary Examiner* — Árpád Fábián-Kovács
(74) *Attorney, Agent, or Firm* — Pearne & Gordon LLP

(57) ABSTRACT

A guiding unit for agricultural products for a device for harvesting the agricultural products comprising a supporting body (2) connectable to the frame (101) of the harvesting device (100) and equipped with a supporting portion (2a) which, during use, is located above the unloading means (106), and a guiding element (5) extending mainly along the main line (A) and connecting means (8) operatively interposed between the guiding element (5) and the supporting portion (2a) of the supporting body (2), designed to allow a translation of the guiding element (5) towards and away from the supporting body (2).

19 Claims, 4 Drawing Sheets

(56) References Cited

U.S. PATENT DOCUMENTS

| | | | |
|---|---|---|---|
| 3,788,053 A * | 1/1974 | Bonnett | A01D 57/28 56/377 |
| 3,815,344 A * | 6/1974 | Kucera | A01F 15/0765 56/1 |
| 3,815,346 A * | 6/1974 | Nelson | A01F 29/01 56/14.3 |
| 3,924,391 A * | 12/1975 | Cheatum | A01F 15/08 56/341 |
| 4,255,923 A * | 3/1981 | Spaida | A01D 89/002 56/14.4 |
| 4,304,090 A * | 12/1981 | Gavrilenko | A01D 89/00 56/190 |
| 4,411,127 A * | 10/1983 | Diederich, Jr. | A01D 89/008 56/364 |
| 4,495,756 A * | 1/1985 | Greiner | A01D 89/002 56/322 |
| 4,516,389 A * | 5/1985 | Core | A01F 15/106 100/13 |
| 4,565,057 A * | 1/1986 | Vissers | A01F 15/08 56/14.4 |
| 4,905,466 A * | 3/1990 | Heppner | A01D 57/00 198/813 |
| 4,981,013 A * | 1/1991 | Underwood | A01D 51/00 56/104 |
| 6,295,797 B1 * | 10/2001 | Naaktgeboren | A01D 89/008 56/341 |
| 6,877,304 B1 * | 4/2005 | Smith | A01F 15/106 56/341 |
| 6,935,094 B1 * | 8/2005 | McClure | A01D 89/008 56/190 |
| 6,962,041 B1 * | 11/2005 | Taylor | A01D 89/008 56/341 |
| 7,107,748 B2 * | 9/2006 | McClure | A01D 89/008 56/190 |
| 7,448,196 B2 * | 11/2008 | Schrag | A01D 89/005 56/341 |
| 7,654,069 B1 * | 2/2010 | Dunham | A01D 89/008 56/190 |
| 7,823,371 B2 | 11/2010 | Gantzer et al. | |
| 9,038,357 B2 * | 5/2015 | Choluj | A01F 15/08 56/190 |
| 9,192,102 B2 * | 11/2015 | Gantzer | A01D 89/008 |
| 2003/0131575 A1 * | 7/2003 | Anstey | A01D 89/008 56/16.4 R |
| 2003/0182921 A1 * | 10/2003 | McClure | A01D 89/008 56/341 |
| 2006/0277888 A1 * | 12/2006 | Erdmann | A01D 89/008 56/344 |
| 2006/0277889 A1 * | 12/2006 | Sheedy | A01D 89/008 56/364 |
| 2008/0163601 A1 * | 7/2008 | Graber | A01D 89/005 56/341 |
| 2009/0100814 A1 * | 4/2009 | Egging | A01D 89/008 56/1 |
| 2009/0282800 A1 | 11/2009 | Gantzer | |
| 2011/0173944 A1 * | 7/2011 | McIlwain | A01D 41/10 56/400.21 |
| 2012/0023884 A1 | 2/2012 | Spikes et al. | |
| 2014/0026533 A1 | 1/2014 | Choluj | |
| 2014/0250855 A1 * | 9/2014 | Vandamme | A01D 89/008 56/379 |
| 2014/0260167 A1 * | 9/2014 | McClure | A01D 89/008 56/190 |

FOREIGN PATENT DOCUMENTS

| | | |
|---|---|---|
| EP | 2 037 727 A1 | 3/2009 |
| EP | 2 689 653 A1 | 1/2014 |
| WO | 2008/000993 A1 | 1/2008 |

* cited by examiner

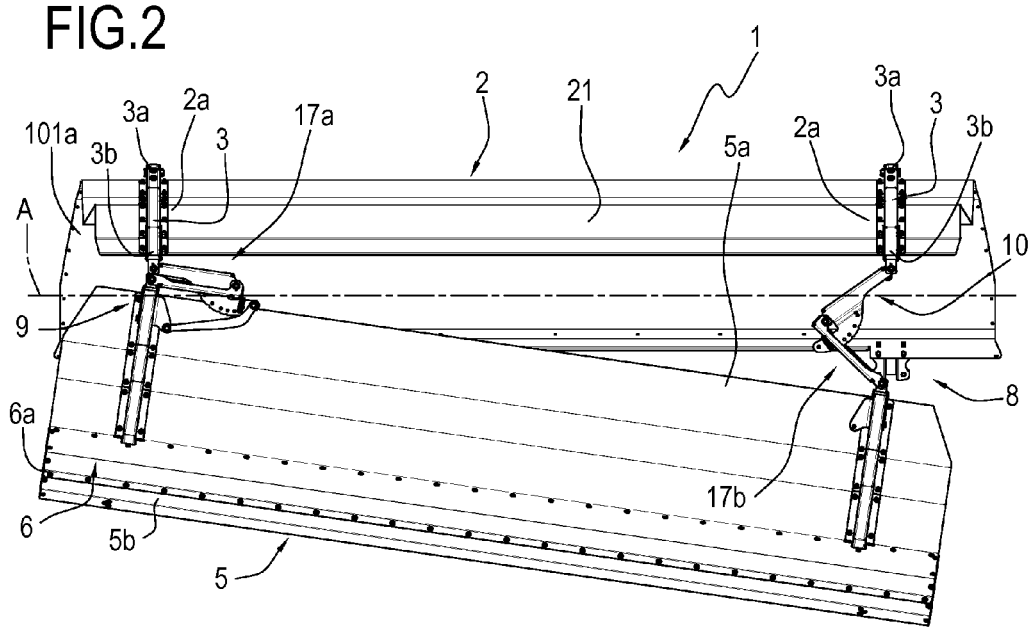
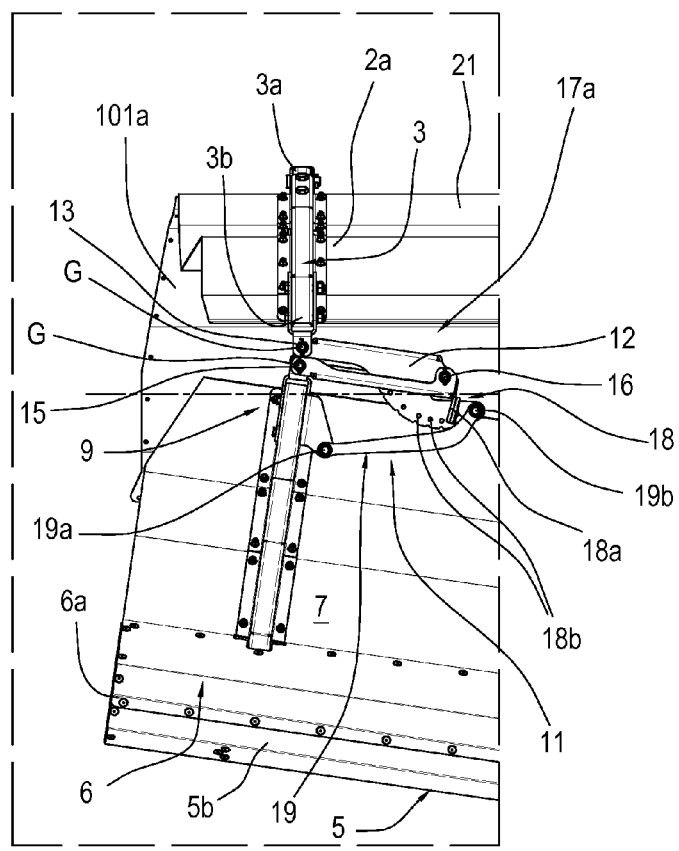

GUIDING UNIT FOR A DEVICE FOR HARVESTING THE LONG AGRICULTURAL PRODUCTS AND DEVICE FOR HARVESTING AGRICULTURAL PRODUCTS COMPRISING THE GUIDING UNIT

BACKGROUND OF THE INVENTION

This invention relates to a guiding unit for agricultural products for a device for harvesting the agricultural products and a device for harvesting agricultural products comprising the guiding unit.

This invention is thus applied in particular in the agricultural sector, in particular in the harvesting of products performed immediately after the cutting (or mowing), or in a subsequent step.

Harvesting devices are normally used for picking up from the ground grass, straw, hay (also cut by other machines) or for picking up pulses and, in any case, for picking up similar agricultural products (usually plants), with a long shape.

For this purpose, they are connected to a pulling vehicle (such as a tractor or a self-propelled agricultural machine) which is used to tow them.

Prior art harvesting devices have a main axis of extension which, during use, remains transversal to the axis of movement of the pulling vehicle. To lift the agricultural products from the ground and move them (prior to unloading), harvesting devices use a plurality of harvesting elements associated therewith and driven by a movement system. The movement system is generally driven by a Cardan joint or the like which, through a power take-off, draws drive power from the engine of the pulling vehicle.

Each pick-up element is in turn provided with one or more juxtaposed tines. The pick-up elements (and the related tines) are usually positioned around the preferred axis of extension along rows parallel with the preferred axis of extension. Each pick-up element (and the related tines) is moved by the movement system along a closed trajectory surrounding the preferred axis of extension. The tines are straight elements with one end coupled (either directly or by means of parts of the respective pick-up element) to the movement system and the other end free.

Operatively downstream of the pick-up elements, devices of this type generally also comprise means for unloading the agricultural products harvested, usually consisting of movement devices, such as conveyor belts, chain conveyors or screw conveyors, located along the axis of extension of the pick-up device immediately downstream of the pick-up elements, in order to transport the agricultural products to the sides of the pulling vehicle.

It should be noted that each of the unloading means has a respective axis of movement, generally parallel to the main line of the frame, that is, transversal to the advancing axis.

Due to the type and the quantity, the products harvested tend to accumulate at the pick-up means, making the outfeed flow from the unloading means irregular and, in any case, causing problems linked to the clogging of the movement zones.

This may actually block the device or form piles with inconstant volumes, which may disturb the pick-up operation.

In this regard, guiding units have been introduced in these devices in the prior art which are able to facilitate the feed motion of the products in the pick-up means thus reducing the causes of malfunctions.

An example of these guiding units is shown in patent document EP2037727, which illustrates a guiding unit defined by a pair of arms pivoted to the frame of the device in such a way as to surmount the unloading means and provided, at their ends, with an array of combs which, in use, are facing the pick-up tines in such a way as to compact the products picked up, thus facilitating the harvesting.

More specifically, the arms are connected to the frame, at the rear of it, through a four-bar linkage which allows the inclination to be varied as a function of the quantity of products to be picked up.

Disadvantageously, this solution is complex from the constructional viewpoint since it requires the replacement of various components of the frame of the device and the design of structurally complex joints.

Moreover, the rotational movement of the guiding unit about a horizontal axis located to the rear of the unloading means does not allow a precise modulation of its action, since a rotation of the arm, even minimal, results in a very substantial translation of the combs.

Moreover, the use of that system does not allow a difference in the inflow of products in the various zones of the device to be taken into consideration, the position of the guiding unit being constrained to that imparted by the zone with the greatest density of products.

SUMMARY OF THE INVENTION

The aim of this invention is therefore to provide a guiding unit for agricultural products for a device for picking up the agricultural products and a device for picking up the agricultural products which is able to overcome the drawbacks of the prior art.

More specifically, the aim of this invention is to provide a guiding unit for agricultural products with high performance levels and ease of installation in a device for picking up the agricultural products.

Moreover, the aim of this invention is to provide a device for picking up agricultural products with high performance levels and which is able to adapt to the flow of the products to be collected.

These aims are achieved by a guiding unit for agricultural products according to one or more of claims 1 to 13, as well as by a device for picking up the agricultural products according to one or more of claims 14 to 19.

More specifically, these aims are achieved by a guiding unit for agricultural products for a device for picking up the agricultural products of the type comprising a frame extending along a main line, pick-up means associated with the frame and unloading means positioned operatively downstream of the pick-up means and movable along the main line, wherein the guiding unit comprises a supporting body connectable to the frame of the pick-up device and provided with a supporting portion which, during use, is located above the unloading means, a guiding element extending mainly along the operating direction and delimited, transversally to the operating direction, by an upper longitudinal edge, proximal to the supporting body, and by a lower longitudinal edge, distal from the supporting body and, in use, opposite and in front of the pick-up means in such a way as to delimit a pass-through section for the products to be harvested, guiding them.

According to one aspect of the invention, the guiding element comprises connecting means operatively interposed between the guiding element and the supporting portion of the supporting body, designed to allow a translation of the guiding element towards and away from the supporting body.

In particular, the connecting means are fixed to the upper longitudinal edge of the guiding element.

Preferably, the connecting means are designed to constrain the guiding element to move towards and away from the supporting body in a single sliding plane.

Advantageously, in this way the guiding element translates in a "front" plane, that is, transversal to the feed direction making it more easy to control its movement, and more easy to adjust the flow of products.

Preferably, the guiding unit is movable, in roto-translation, in a plane transversal to the feed direction, preferably inclined relative to a horizontal plane for supporting the device.

Advantageously, in this way the guiding element can be translated both after a vertical action, performed by the products picked up by the pick-up means, and after a horizontal action.

In this regard, it should be noted that, preferably, the connecting means comprise a first and a second elbow-style kinematic mechanism spaced from each other along the operating direction, each connected to a half-part of the guiding element to allow a roto-translation relative to the supporting body.

In other words, the guiding element is connected to the supporting body in such a way that it can both oscillate rigidly towards and away from the guiding element and tilt, varying its inclination, in the sliding plane, relative to the supporting body.

Advantageously, in this way the guiding unit is able to adapt to the various operating conditions, varying the position of the guiding element relative to the supporting body in a localised manner, that is, adapting the inclination of the guiding element as a function of the quantity of products in the various pick-up zones.

BRIEF DESCRIPTION OF THE DRAWINGS

These and other features are more apparent from the detailed description, set out below, of a preferred non-limiting example embodiment of a guiding unit for agricultural products for a device for harvesting the agricultural products and a device for harvesting agricultural products comprising the guiding unit as illustrated in the accompanying drawings, in which:

FIGS. 2 and 2a are a front view and a detail of the guiding unit of FIG. 1;

DESCRIPTION OF THE PREFERRED EMBODIMENTS

Figure 1:
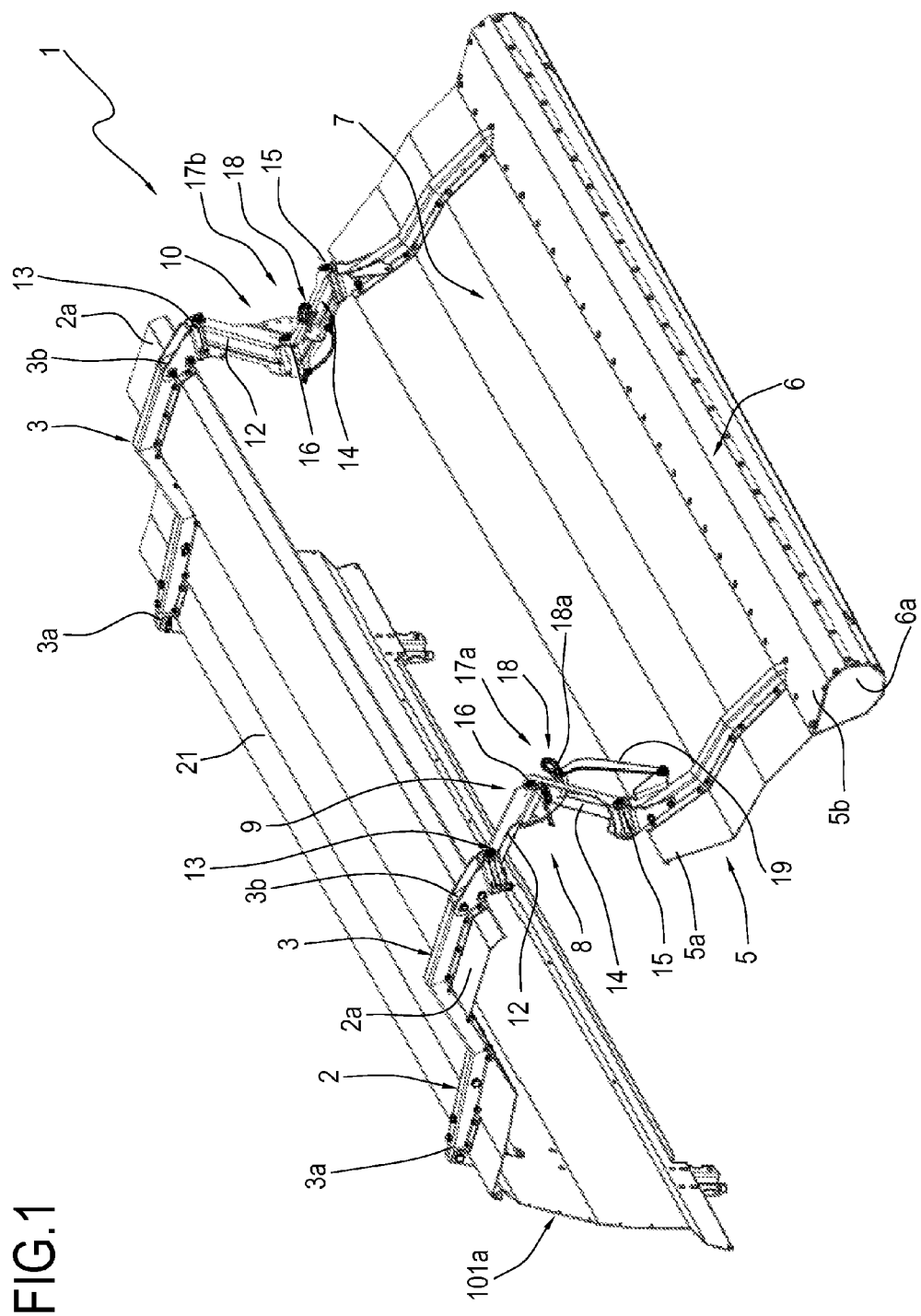
FIG. 1 is a perspective view of a guiding unit for a device for picking up agricultural products according to this invention.
Figure 3A:
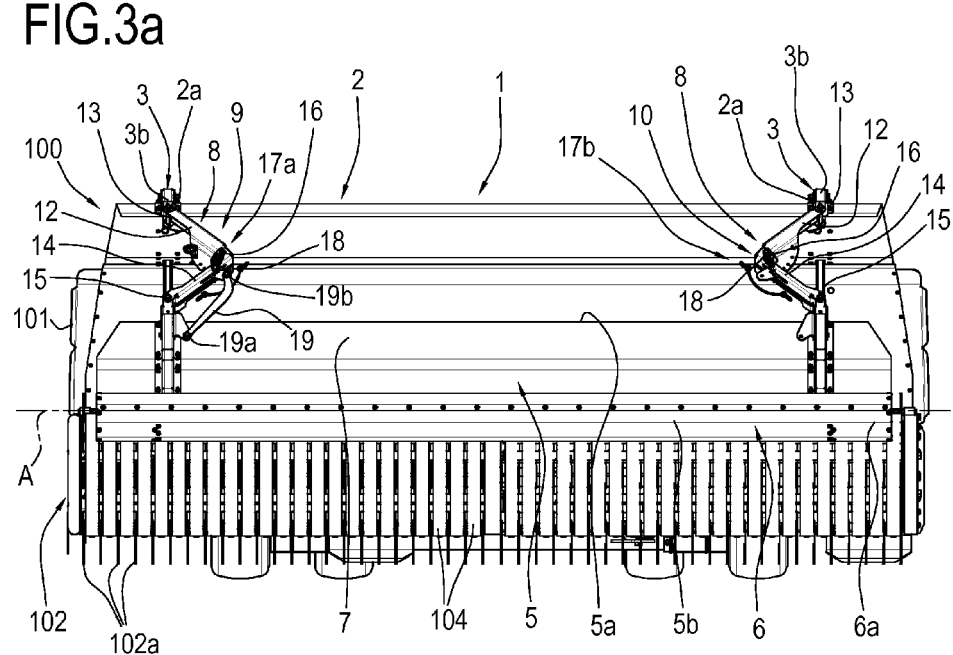
FIGS. 3a and 3b are a front view and a side view of a device for picking up agricultural products according to this invention, wherein the guiding unit is in a first operating position.
Figure 3B:
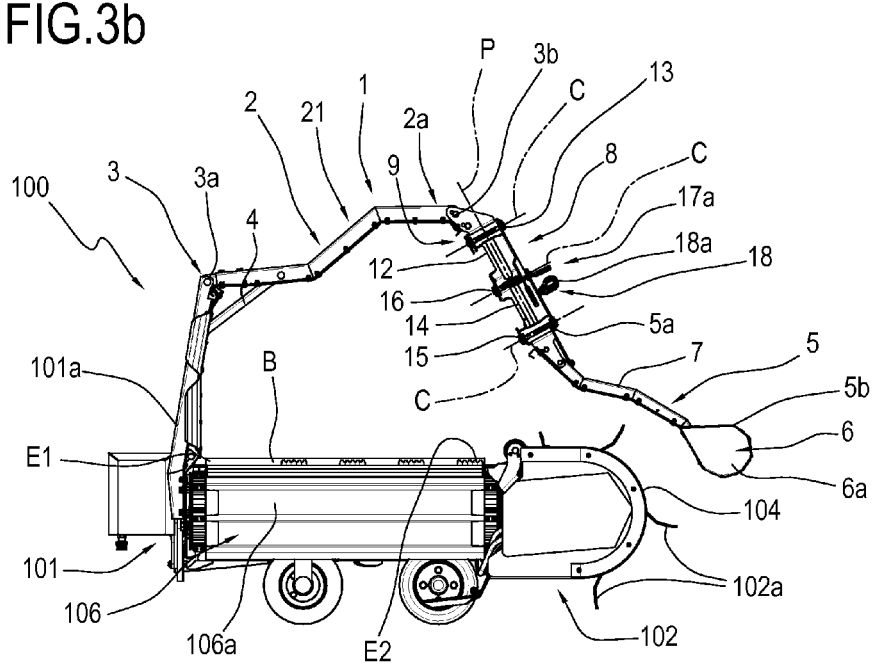
Figure 4A:
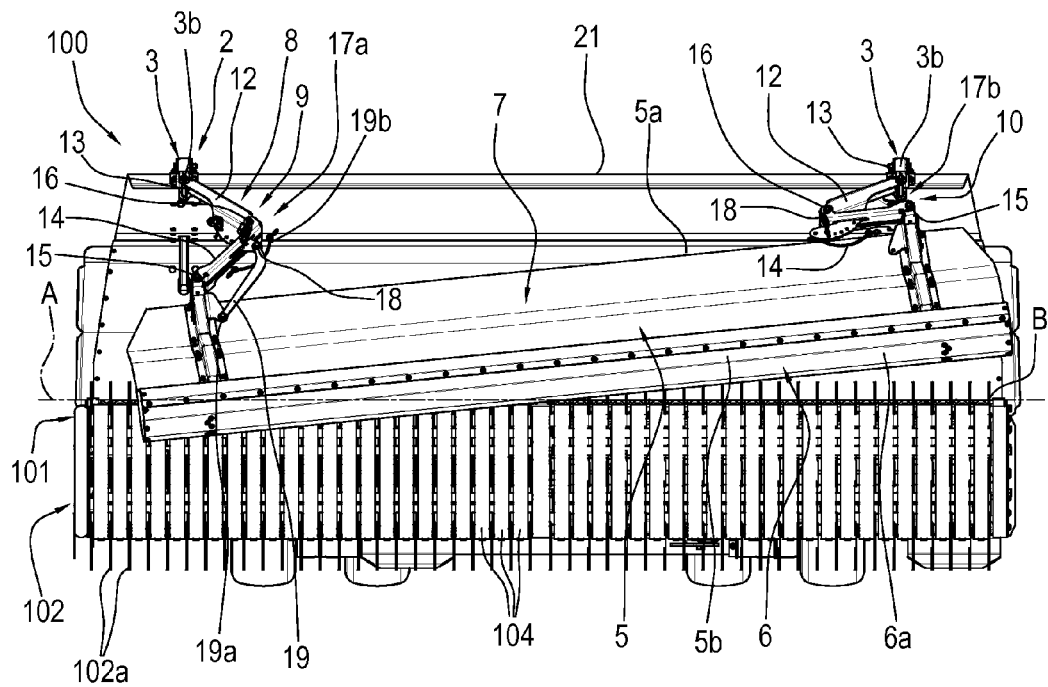
FIGS. 4a and 4b are a front view and a side view of a device for picking up agricultural products according to this invention, wherein the guiding unit is in a second operating position.
Figure 4B:
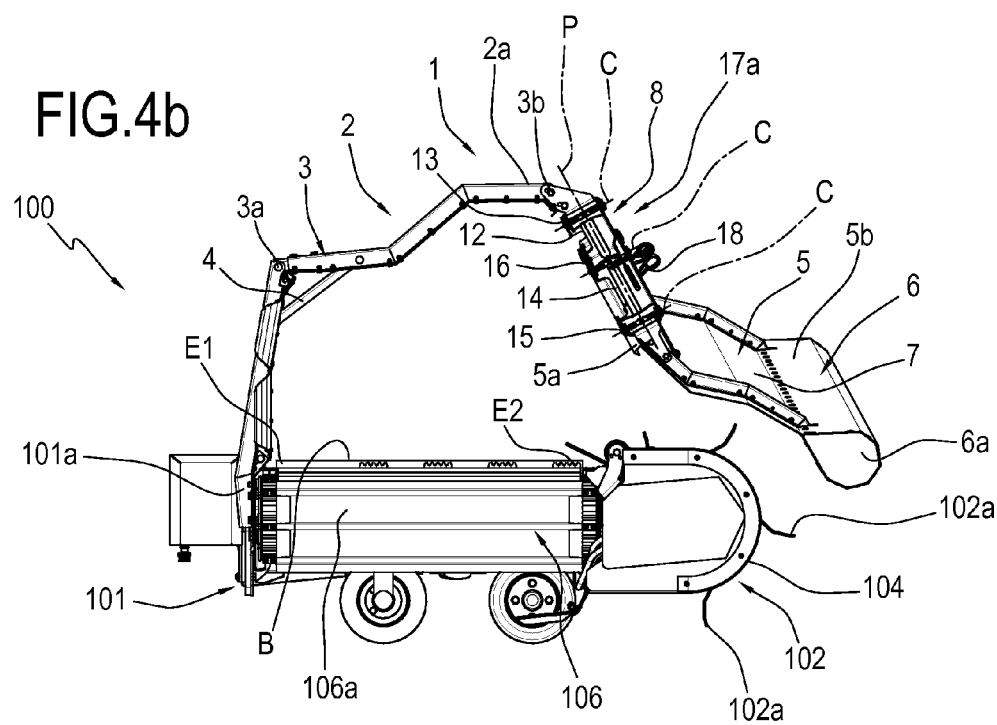

With reference to the accompanying drawings, the numeral 1 denotes a guiding unit for a device 100 for harvesting agricultural products, preferably fine-stemmed and longitudinal products, such as, for example, grass, straw, hay or for harvesting pulses.

The harvesting device 100 is of the type which can be moved by a movement (or pulling) vehicle along a path on which a multitude of long, and preferably thin, agricultural products lie, the harvesting device 100 being designed to lift them from the ground using pick-up means 102 and to transport them on specific unloading means or into a receiving chamber by means of a specific movement system.

More precisely, the device comprises a frame 101 extensing along a main axis of extension "A" which, during use, remains transversal to the axis of movement (or of advancing) of the pulling vehicle. The frame preferably comprises coupling means (not illustrated) by which it is connected to the pulling vehicle and protruding transversely (preferably at right angles) to the direction of extension "A".

The device 100 comprises pick-up means 102 for harvesting the agricultural products. Preferably, the pick-up means 102 comprise a plurality of rotatable pick-up elements 102a, each in turn equipped with at least one long harvesting tine.

It should be noted that the pick-up elements 102a are arranged in succession along the main line "A" (and spaced, preferably equispaced, from each other).

Advantageously, therefore, the pick-up elements 102a are arranged along the extension of the device, thereby increasing the working portion thereof.

Preferably, the tines are arranged around the same central axis of rotation, oriented radially thereto in spoke-like fashion.

In this regard, the harvesting device 100 comprises a movement system for moving each of the pick-up elements 102a along a closed path surrounding the main line "A" (corresponding to the aforementioned central axis). In other words, the product harvesting axis is transversal, preferably at right angles, to the main line "A".

The closed path comprises a transporting stretch along which the agricultural product is transported between a pickup point where the product is lifted from the ground by the long tines and a release point where the agricultural product is disengaged from the tines.

The harvesting device 100 also comprises a plurality of bands 104 fixed to the frame 101, juxtaposed along the main line "A" and spaced from each other in such a way that each pick-up element 102a is at least partly interposed between two consecutive bands 104.

The bands 104 are defined by curved members shaped in such a way as to surround the main line "A" at least at the forward stroke of the tines (that is, the closed path).

Moreover, the harvesting device 100 comprises agricultural product unloading means 106 located downstream of the pick-up means 102 (more specifically, downstream of the release point), configured to transport the agricultural products and release them at the sides (or, if necessary, at the back) of the pulling vehicle.

Consequently, the main line "A" is a direction of movement of the unloading means 106. This direction is transversal, preferably at right angles, to the harvesting direction described above.

Hereinafter, unless otherwise specified, the direction "A" denotes both the direction of extension and the direction of movement.

In the preferred embodiment, the unloading means 106 form a supporting surface "B" for the agricultural products harvested and are mobile along the main line "A" to release the agricultural products to the sides of the pulling vehicle.

As illustrated, the device 100 (and more specifically, the unloading means 106) comprises a conveyor belt 106a operatively located downstream of the pick-up means 102 and forming a supporting surface "B" for the agricultural products transported by the conveyor unit 1.

More specifically, the conveyor belt 106a forms a supporting surface "B" which is mobile along the axis "A" to release the agricultural products to the sides of the pulling vehicle.

It should be noted that the conveyor belt could be replaced by any cyclic movement apparatus capable of defining a mobile supporting surface for the products, such as, for example, a chain conveyor, a track conveyor or the like.

Alternatively, in an embodiment not illustrated, the unloading means might be defined by more aggressive means, such as a screw feeder or the like.

According to the invention, the device comprises a unit 1 for guiding the agricultural products, associated with the frame 101 and operating at the pick-up means 102.

The guiding unit 1 can be preferably associated with the frame 101 in a removable fashion, that is, it can be both integrated in the device 1 and marketed as an accessory element.

The guiding unit 1 comprises a supporting body 2 connected to the frame 101 of the harvesting device 100 and provided with a supporting portion 2a which, during use, is located above the unloading means 106.

Thus, the supporting body 2 extends at least in part above the unloading means 106, at a predetermined distance from them.

More specifically, the supporting portion 2a is situated at a greater height than the supporting surface "B," at a predetermined distance from it.

For this reason, the supporting body 2 is over the unloading means 106 and the supporting portion 2a is positioned above a half-part of the unloading means 106 proximal to the pick-up means 102.

This half-part is measured with reference to a middle axis of the unloading means 106 which is oriented along (that is, parallel to) the main line "A".

It should be noted that the frame 101 comprises at least one rear element 101a, positioned on the opposite side of the unloading means 106 relative to the pick-up means 102.

In other words, the unloading means 106 extend along the main line "A" along two edges "E1," "E2," wherein a first edge "E1" is facing the rear element 101a of the frame 101 and a second edge "E2" is facing the pick-up means 102.

Preferably, the rear element 101a of the frame 101 is equipped with at least one a free end, projecting above the unloading means 106.

Thus, preferably, the rear element 101a is protruding above the supporting surface "B", that is, it rises away from it.

The supporting body 2 comprises at least a bar 3 extending above the unloading means 106 (that is, of the supporting surface "B") between its own first end 3a, rigidly constrained to the free end of the rear element 101a, and a second end 3b forming the supporting portion 2a.

Thus, in the embodiment illustrated, the bar 3 is positioned in a cantilever fashion relative to the rear element 101a of the frame 101.

It should be noted that the supporting body 2 comprises a plurality of bars 3, preferably two, positioned in succession, that is, spaced from each other, along the main line "A".

Further, as illustrated in the accompanying drawings, the supporting body 2 comprises a covering element 21 extending between the bars 3 and opposite the unloading means 106.

In the preferred embodiment, the guiding unit 1 comprises adjustment means 4 interposed between the rear portion 101a of the frame 101 and the supporting body 2.

More specifically, the adjustment means 4 are operatively interposed between the rear portion 101a of the frame 101 and the bar 3 (that is, the bars 3).

In the embodiment illustrated, the adjustment means 4 are designed to allow the setting of the angle delimited between the rear portion 101a and the bar 4.

Preferably, the adjustment means 4 comprise a pair of slidably associated bodies and an adjusting pin designed to lock the relative sliding between the bodies in a predetermined angular position.

To allow the action on the products picked up (or being picked up), the guiding unit 1 also comprises a guiding element 5 extending mainly along the main line "A" and delimited, transversally to it, by an upper longitudinal edge 5a, proximal to the supporting body 2, and by a lower longitudinal edge 5b, distal from the supporting body 2.

Thus, the guiding element 5 extends along the main line "A" (that is, parallel to it) between two longitudinal edges, upper 5a and lower 5b.

In use, the longitudinal edge 5b is opposite and in front of the pick-up means 102 in such a way as to delimit a pass-through section for the products to be harvested, guiding them.

Thus, the lower edge 5b of the guiding element 5 is located at a distance from the pick-up means such as to define (and delimit) the space for transit of the agricultural products.

In this regard, the guiding element 5 is provided, at its lower longitudinal edge 5b, with an active portion 6 having a weight such that, in the absence of external forces, it keeps the guiding element close to the pick-up means 102 (that is, in a position away from the supporting body 2).

Preferably, the active portion is defined by a tubular body 6a or by a bar extending along the main line "A" and defining the lower longitudinal edge 5b of the guiding element 5.

Alternatively, the active portion could be defined by a roller or by a grille.

Structurally, also, the guiding element 5 comprises at least one panel 7 extending along the main line "A" and delimited, transversally to the main line "A", by the upper longitudinal edge 5a and by the lower longitudinal edge 5b.

Thus, in the preferred embodiment, the guiding element 5 is defined by a panel 7 or covering element extending between the upper longitudinal edge 5a, connected to the supporting body 2, and the lower longitudinal edge 5b, defined by the active portion 6.

Preferably, the panel 7 has, near to the lower longitudinal edge 5b, a concavity oriented towards the pick-up means 102, in order to follow a curved path which the products move along on the pick-up means 102.

In other words, the panel 7, near to the lower longitudinal edge 5b, has a concavity oriented towards the pick-up means 102 in order to follow the movement of the pick-up elements 102a.

According to one aspect of the invention, the guiding unit 1 comprises connecting means 8 operatively interposed between the guiding element 5 and the supporting portion 2a of the supporting body 2.

More specifically, the connecting means 8 are fixed in the proximity of the upper longitudinal edge 5a of the guiding element 5.

These connecting means 8 are designed to allow a translation of the guiding element 5 towards and away from the supporting body 2.

More specifically, the guiding element 5 is movable towards and away from the supporting body 2 to define, respectively, up and down movements depending on the quantity of products to be harvested, for guiding their flow on the pick-up means 102.

Advantageously, in this way the guiding element 5 is simple to construct and to install, and at the same time the translating movement allows a precise adjustment of the space for transit of the products.

Preferably, the connecting means 8 are designed to constrain the guiding element 5 to move towards and away from the supporting body in a single sliding plane "P".

More specifically, the connecting means 8 are designed to allow translation of the guiding element 5 in a sliding plane "P" which is set at an angle to a vertical direction.

Thus, the guiding element 5 and the connecting means 8 are designed to allow a translation of the guiding element 5 in the sliding plane following both a pushing action performed by the products on the pick-up means (substantially vertical) and a pushing action performed horizontally on the lower longitudinal edge 5b.

In the preferred embodiment, the sliding plane "P" is set at an angle, relative to a vertical direction, of between −70° and +45°.

Preferably, the preferred angle of inclination is between −40° and −20°.

It should be noted that, during use, the inclination of the sliding plane "P" is fixed.

However, in the preferred embodiments there are adjusting units designed to allow the setting of a predetermined inclination of the sliding plane "P," that is, a predetermined inclination between the supporting body 2 and the guiding element 5.

Advantageously, in this way it is possible adapt the performance and the behaviour of the guiding unit 1 depending on the application of the device, that is, the type and quantity of products to be picked up.

Preferably, the connecting means 8 comprise at least first connecting means 9 and second connecting means 10 both interposed between the supporting body 2 and the guiding element 5.

The first 9 and second 9 connecting means are spaced from each other along the main line "A".

Moreover, the first connecting means 9 and the second connecting means 10 being movable independently of one another between a contracted position and an extended position for allowing a roto-translation of the guiding element 5 relative to the supporting body 2.

Advantageously, in this way the guiding unit 1 is able to adapt to the different flow conditions of the products at the two sides of the device.

In effect, since the extension of the device 100 and the pick-up means 102 is very pronounced along the main line "A", the flow of products in the various zones is subject, due to its very nature or after previous processing operations, to a certain variability.

In this regard, the first 9 and second 10 connection means are preferably connected to two separate half-parts of the guiding element 5, located on opposite sides of a median line of the device 1 at right angles to the main line "A."

The presence of an independent movement between the two half-parts of the guiding element 5 allows the unit 1 to adapt better to this variability.

Preferably, the first connecting means 9 and second connecting means 10 are connected to the supporting body 2 and to the guiding element 5 at respective joint points "G".

More specifically, the connecting means 8 (that is, both the first 9 and second 10 connecting means) comprise at least a first arm 12 pivoting at the supporting body 2 at a first pin 13 and a second arm 14 pivoting at the guiding element 5 at a second pin 15.

It should be noted that the first pin 13 and the second pin 15 define the joint points "G" mentioned above.

Moreover, the first arm 12 and second arm 14 are rotatably connected to one another at a third pin 16 for forming an elbow-style kinematic mechanism 17a, 17b in which the arms 12, 14 are rotatably movable between a closed position and an open position.

It should be noted that the first pin 13, second pin 15 and third pin 16 define axes of rotation "C" which are substantially parallel to one another and orthogonal to a plane of movement "P" of the guiding element 5.

Thus, the connecting means 8 comprise two elbow-style kinematic mechanisms 17a, 17b, each forming, respectively, the first 9 and the second 10 connecting means.

More specifically, the connecting means 8 comprise a first 17a and a second elbow-style kinematic mechanism 17a.

In other words, each elbow-style kinematic mechanism 17a, 17b is connected to a different half-part of the guiding element 5 for allowing a roto-translation (in the sliding plane "P") relative to the supporting body 2.

In the preferred embodiment, the elbow-style kinematic mechanisms 17a, 17b are oriented towards each other.

In other words, the third pins 16 are proximal to each other relative to the first 13 and second 15 pins.

Preferably, each elbow-style kinematic mechanism 17a, 17b comprises at least one locking body 18 operatively interposed between the first arm 9 and the second arm 10 for limiting the opening of the first arm 12 and the second arm 14 to a predetermined angular value.

In other words, the locking element 18 is designed to limit the distance between the guiding element 5 and the supporting body 2 in the far position.

In the preferred embodiment, the locking body 18 is defined by a pin or split pin 18a which can be inserted in the first arm 12 or second arm 14 and which can come into abutment respectively with the second arm 14 or with the first arm 12 in the open position (corresponding to the extended position of the first 9 and second 10 connecting means).

Preferably, the first arm 12 or the second arm 14 is equipped with a plurality of seats 18b which can be coupled with the split pin 18a to allow an adjustment of the opening stroke between the arms 12, 14.

It should be noted that, preferably, the first connecting means 9 are provided with at least one constraining element 11 designed to keep linear the relative movement of its joint points "G" during the movement between the contracted position and the extended position.

More specifically, one of the elbow-style kinematic mechanisms 17a (that is, the first) comprises at least a rod 19 extending between a first end 19a connected to the guiding element 5 and a second end 19b connected to the first arm 12 for constraining the movement of the second pin 15 relative to the first pin 13 limiting their offset.

The rod 19 defines at least partly the constraining element 11.

Preferably, also, the connecting means 8 comprise a piston (not illustrated) operatively interposed between the first arm 12 and the second arm 14 of at least one elbow-style kinematic mechanism 17a, 17b, preferably of both.

The piston (preferably of a pneumatic or hydraulic type) is designed to contribute to the movement from the open position to the closed position.

Thus, the piston acts as an auxiliary actuator during the rising of the guiding element 5.

Preferably, moreover, the piston is designed to oppose the lowering of the guiding element 5, that is, the opening of the elbow-style kinematic mechanism 17a, 17b.

Advantageously, this reduces the impacts and the stress on the pins, increasing the working life of the guiding unit 1.

In a preferred embodiment, the guiding element 5 is modularly disconnectable from the supporting body 2.

Preferably, the third pins 13 are removable to allow an uncoupling between the guiding element 5 and the supporting body 2.

Advantageously, in this way may, the operator, if it is not used, remove the guiding element 5 (and the connecting means 8), keeping solely the supporting body 2 anchored to the frame of the device 100.

In particular, when the supporting body 2 comprises the covering element 21, this allows the operator to unlink the screening function of the covering element 21 from that of guiding the guiding element 5.

The invention achieves the preset aims and brings major advantages.

In effect, the presence of a slidable guiding element, preferably in a single plane, during raising and lowering, allows a more effective and simple adjustment of the action of the products.

Moreover, the use of one or more joints at a front zone of the device, immediately above the pick-up means, considerably reduces the lever effect and thus the stress on the structure.

Also, the presence of at least two connecting units movable independently of each other allows a roto-translation of the guiding element, preferably a panel, in the sliding plane, which makes the guiding unit even more functional and high performing.

What is claimed:

1. A guiding unit for agricultural products for a device for harvesting said agricultural products, said device comprising a frame (101) extending along a main line (A), pick-up means (102) associated with the frame (101) and unloading means (106) which are operatively positioned downstream of the pick-up means (102) moving along the main line (A), said guiding unit comprising:
   a supporting body (2) connectable to the frame (101) of the harvesting device (100) and provided with a supporting portion (2a) which, during use, is located above the unloading means (106);
   a guiding element (5) extending mainly along said main line (A) and delimited, transversally to said main line, by an upper longitudinal edge (5a), proximal to the supporting body (2), and by a lower longitudinal edge (5b), distal from the supporting body (2) and, in use, opposite and in front of the pick-up means (102) in such a way as to delimit a pass-through section for the products to be harvested, guiding them;
   characterised in that it comprises connecting means (8) operatively interposed between the guiding element (5) and said supporting portion (2a) of the supporting body (2), designed to allow a translation, in a plane extending along said main line (A), of said guiding element (5) towards and away from the supporting body (2); wherein the connecting means (8) comprise at least a first arm (12) pivoting at the supporting body (2) at a first pin (13) and a second arm (14) pivoting at the guiding element (5) at a second pin (15); said first arm (12) and second arm (14) being rotatably connected to one another at a third pin (16) for forming an elbow-style kinematic mechanism (17a, 17b) in which the arms (12, 14) are rotatably movable between a closed position and an open position.

2. The guiding unit according to claim 1, characterised in that said connecting means (8) are designed to constrain said guiding element (5) to move towards and away from the supporting body in a single sliding plane (P).

3. The guiding unit according to claim 1, characterised in that said connecting means (8) comprise at least first connecting means (9) and second connecting means (10) both interposed between the supporting body (2) and the guiding element (5) and spaced from one another along the main line (A); said first connecting means (9) and said second connecting means (10) being movable independently of one another between a contracted position and an extended position for allowing a roto-translation of the guiding element (5) relative to said supporting body (2).

4. The guiding unit according to claim 3, characterised in that said first connecting means (9) and second connecting means (10) are connected to the supporting body (2) and to the guiding element (5) at respective joint points (G); said first connecting means (9) being provided with at least one constraining element (11) designed to keep linear the relative movement of its joint points (G) during the movement between the contracted position and the extended position.

5. The guiding unit according to claim 1, characterised in that said elbow-style kinematic mechanism (17a, 17b) comprises at least one locking body (18) operatively interposed between said first arm (12) and said second arm (14) for limiting the opening of the first arm (12) and the second arm (14) to a predetermined angular value.

6. The guiding unit according to claim 1, characterised in that said first pin (13), second pin (15) and third pin (16) define axes of rotation (C) which are substantially parallel to one another and orthogonal to a plane of movement of the guiding element (5).

7. The guiding unit according to claim 1, characterised in that the connecting means (8) comprise a first (17a) and a second (17b) elbow-style kinematic mechanism, spaced from one another along the main line (A), each connected to a half-part of said guiding element (5) for allowing its roto-translation relative to said supporting body (2).

8. The guiding unit according to claim 7, characterised in that said first elbow-style kinematic mechanism (17a) comprises at least a rod (19) extending between a first end (19a) connected to the guiding element (5) and a second end (19b) connected to the first arm (12) for constraining the movement of the second pin (15) relative to the first pin (13) limiting their offset.

9. The guiding unit according to claim 1, characterised in that the connecting means (8) comprise a piston (20) operatively interposed between the first arm (12) and the second arm (14) and designed to contribute to the movement from the closed position to the open position.

10. The guiding unit according to claim 1, characterised in that said guiding element (5) is provided, at its lower longitudinal edge (5b), with an active portion (6) having a weight such that, in the absence of external forces, it keeps the guiding element in a position away from the supporting body (2).

11. The guiding unit according to claim 1, characterised in that the guiding element (5) comprises at least one panel (7) extending along the main line (A) and delimited, transversally to said main line (A), by the upper longitudinal edge (5a) and by the lower longitudinal edge (5b).

12. The guiding unit according to claim 11, characterised in that said panel (7) comprises, near to the lower longitudinal edge (5b) a concavity which, in use, is oriented towards the pick-up means for following a curved path which the products move along on the pick-up means (102).

13. A device for harvesting long agricultural products comprising:
   a frame (101) extending along its own main line (A), in use transversal to a line of travel of the device (100);
   agricultural product pick-up means (102) designed to pick-up said agricultural products from the ground;
   unloading means (106) operatively positioned downstream of the pick-up means (102) and movable along said main line (A);
   characterised in that it comprises a guiding unit (1) according to claim 1, in which the supporting body (2) is anchored to the frame (101) in such a way that the supporting portion (2a) is positioned above the unloading means (106) and the guiding element (5) is opposite the pick-up means (102) with its lower longitudinal edge (5b) projecting in front of them; said guiding element (5) moving towards and away from said supporting body (2) to define, respectively, up and down movements, for guiding the flow of harvested products on the pick-up means (102).

14. The agricultural product harvesting device according to claim 13, characterised in that said connecting means (8) are designed to allow translation of the guiding element (5) in a sliding plane (P) which is set at an angle to a vertical direction.

15. The agricultural product harvesting device according to claim 14, characterised in that said sliding plane (P) is set at an angle, relative to a vertical direction, of between −70° and +45°.

16. The agricultural product harvesting device according to claim 13, characterised in that said supporting body (2) is over said unloading means (106) and the supporting portion (2a) is positioned above a half-part of said unloading means (106) proximal to the pick-up means (102) relative to a middle axis of the unloading means (106) which is oriented along the main line (A).

17. The agricultural product harvesting device according to claim 16, characterised in that the frame (101) comprises at least a rear element (101a), positioned on a side of the unloading means (106) opposite to the pick-up means (102) and provided with at least one free end projecting above the unloading means (106); said supporting body (2) comprising at least a bar (3) extending above the unloading means (106) between its own first end (3a), rigidly constrained to said free end of the rear element (101a), and a second end (3b) forming said supporting portion (2a).

18. The agricultural product harvesting device according to claim 13, characterised in that the pick-up means (102) comprise a plurality of agricultural product pick-up elements (102a), each in turn equipped with at least one long harvesting tine, and a system for moving each of the pick-up elements along a closed trajectory surrounding the main line of extension; said guiding element (5) comprising a panel (7) which, near to the lower longitudinal edge (5b) comprises a concavity oriented towards said pick-up means (102) for following the movement of the pick-up elements (102a).

19. The agricultural product harvesting device according to claim 13, characterised in that the supporting body (2) comprises a covering element (21) extending between bars (3) and opposite the unloading means (106).

* * * * *